US012789536B2

(12) United States Patent
O'Hagan

(10) Patent No.: US 12,789,536 B2
(45) Date of Patent: Nov. 10, 2026

(54) PEEL AND PERFORATE ROLLER

(71) Applicant: ZEBRA TECHNOLOGIES CORPORATION, Lincolnshire, IL (US)

(72) Inventor: James J. O'Hagan, McHenry, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 281 days.

(21) Appl. No.: 18/390,279

(22) Filed: Dec. 20, 2023

(65) Prior Publication Data

US 2025/0206483 A1 Jun. 26, 2025

(51) Int. Cl.

| | |
|---|---|
| ***B65B 61/02*** | (2006.01) |
| ***B32B 38/10*** | (2006.01) |
| ***B32B 43/00*** | (2006.01) |
| ***B41J 3/407*** | (2006.01) |
| ***B65D 81/05*** | (2006.01) |

(52) U.S. Cl.

CPC ............. *B41J 3/4075* (2013.01); *B32B 38/10* (2013.01); *B32B 43/006* (2013.01); *B65B 61/02* (2013.01); *B65D 81/05* (2013.01)

(58) Field of Classification Search

CPC ........ B65B 61/02; B65D 81/02; B65D 81/05; B41J 3/407; B41J 3/4075; B32B 43/006; B32B 38/10

See application file for complete search history.

(56) References Cited

U.S. PATENT DOCUMENTS

2002/0117263 A1* 8/2002 McKenney ............... B65C 9/44 156/64
2016/0263881 A1* 9/2016 Chida .................. B32B 43/006

OTHER PUBLICATIONS

Instructions on how to use Scotch Cushion Lock, https://multimedia.3m.com/mws/media/23534180/instructions-on-how-to-use-scotch-cushion-lock.pdf, May 17, 2023.
Product Information Sheet Scotch Cushion Lock Protective Wrap, https://multimedia.3m.com/mws/media/2353423O/product-information-sheet-about-scotch-cushion-lock-protective-wrap.pdf, Aug. 30, 2022.
Scotch Cushion Lock Protective Wrap Sell Sheet, https://multimedia.3m.com/mws/media/22557260/cushion-lock-2022-sell-sheet-idc.pdf, 2022.

* cited by examiner

*Primary Examiner* — Douglas X Rodriguez
*Assistant Examiner* — Kendrick X Liu

(57) ABSTRACT

Peel and Perforate rollers are disclosed herein. An example peel and perforate roller includes a substrate separator configured to receive a web of a printable substrate temporarily adhered to a liner and to separate the printable substrate from the liner; a substrate process path configured to receive printable substrate separated from the liner by the substrate separator; a liner process path separate from the substrate process path and configured to receive the liner separated from the printable substrate by the substrate separator; an incising assembly configured to receive the separated liner along the liner process path and to impart lines of weakness into the separated liner.

7 Claims, 8 Drawing Sheets

PEEL AND PERFORATE ROLLER

BACKGROUND

Thermal printers have become nearly ubiquitous for the printing of shipping labels, and at a time when businesses are shipping more packages than ever, millions of shipping labels are printed on a daily basis across the world. Many such shipping labels include an adhesive surface by which to attach to the various packages they are meant to identify, and are delivered to shipping centers temporarily adhered to a liner. This liner often includes a release surface to allow the adhesive labels to be easily separated from the liner and then applied to a package. In some cases, the release surface precludes the liner from being recycled by routinely accessible means.

SUMMARY

One example embodiment of the present disclosure is a device including a substrate separator configured to receive a web of a printable substrate temporarily adhered to a liner and to separate the printable substrate from the liner. The device also includes a substrate process path configured to receive printable substrate separated from the liner by the substrate separator. The device also includes a liner process path separate from the substrate process path and configured to receive the liner separated from the printable substrate by the substrate separator. The device also includes an incising assembly configured to receive the separated liner along the liner process path and to impart lines of weakness into the separated liner.

In a variation of this embodiment, the incising assembly is further configured to apply the lines of weakness to the liner so that when a tensile force is applied to a section of the incised liner, gaps form along the lines of weakness in the section of the liner, such that the section of the liner remains unitary while increasing in a length in a direction of the tensile force.

In a variation of this embodiment, a factor of expansion of the section of incised liner in the direction of the tensile force is in a range of 1.1 to 4.

In a variation of this embodiment, the device includes a reuptake mechanism, downstream of the incising assembly along the liner process path, and configured to wind the incised liner about a roll or fold the incised liner into a fan-fold stack.

In a variation of this embodiment, the incising assembly is at least one selected from a group consisting of: a die and press, a rolling die and press, a punch, a slicer, a scorer, a perforator, and a laser cutter.

In a variation of this embodiment, the lines of weakness imparted by the incising assembly are at least one selected from a group consisting of a score line, a perforated line, a fold, a punched hole, and a cut.

In a variation of this embodiment, the device is a thermal printer and the printable substrate is a configured for printing by a thermal printhead of the thermal printer.

Another embodiment of the present disclosure is a packing product, including a flexible material, having two faces, rolled about a spool and having a silicone release agent coating at least one of the two faces. The flexible material is imparted with lines of weakness configured such that, when unspooled and a tensile force applied to a section of the flexible material, gaps form along the lines of weakness in the section of the flexible material while the section of the flexible material remains unitary while increasing in a length in a direction of the tensile force.

In a variation of this embodiment, the flexible material is removable substrate removed from a printable media having an adhesive backing.

In a variation of this embodiment, the flexible material is composed from one or more materials chosen from a group consisting of glassine paper, clay coated kraft back paper, polyethylene terephthalate, polytetrafluoroethylene, or filmic backing.

Another example embodiment of the present disclosure is a process for recycling a spent liner into a packing product. The procedure includes feeding a web of printable media comprising a printable substrate temporarily adhered to a liner, through an upstream end of a printing device. The process further includes pulling the web over a substrate separator such that a portion of the printable substrate separates from the liner. The process further includes and imparting lines of weakness into the separated backing.

In a variation of this embodiment, the lines of weakness are imparted by an incising assembly configured to impart the lines of weakness such that when a tensile force is applied to a section of the incised liner, the lines of weakness form gaps in the section of incised liner, such that the section of incised liner remains unitary while increasing in length in a direction of the tensile force.

In a variation of this embodiment, the section of incised liner, when expanded, is configured to be deformed into a configuration having a decreased packing density and elevated shock absorption capabilities relative to the section of incised liner prior to expansion.

In a variation of this embodiment, the method further includes winding the incised liner onto a reuptake spool.

In a variation of this embodiment, the method further includes and expanding the section of incised liner to form a packing material by applying a tensile force to the section of the incised liner.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
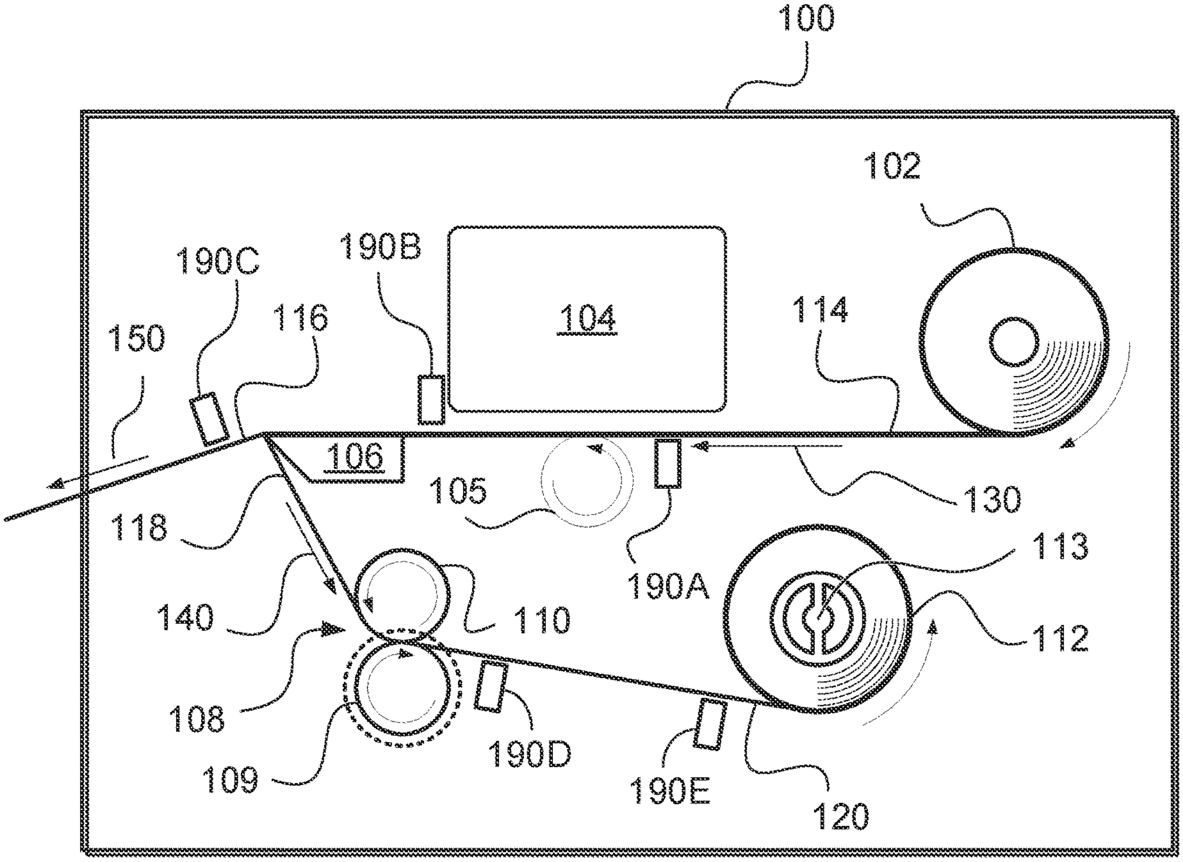
FIG. 1 illustrates a schematic of a thermal printer including a peel and perforate roller according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure describes an apparatus, item of manufacture and method generally relating to recycling spent liner from adhesive labels in a printing apparatus. By implementing an incising assembly in conjunction with a printing apparatus having a peeling mechanism and reuptake mechanism, the separated liner is incised with lines of weakness, which allows the liner to expand into a packing product for use as a package filler. This disclosure encompasses embodiments in which the peeling mechanism, incising assembly, and reuptake mechanism are implemented with varying degrees of integration with the printer, such that in certain embodiments, the referenced elements may be external to the printer. This method and apparatus enables a previous source of waste to become a source of a useful article in a shipping or packing facility where labels are printed. Described below are a label printing device, containing an incising assembly, configured to produce a packing product from separated liner, a packing product produced by the printing device, and a method for producing the packing product within the printing device.

Figure 1B:
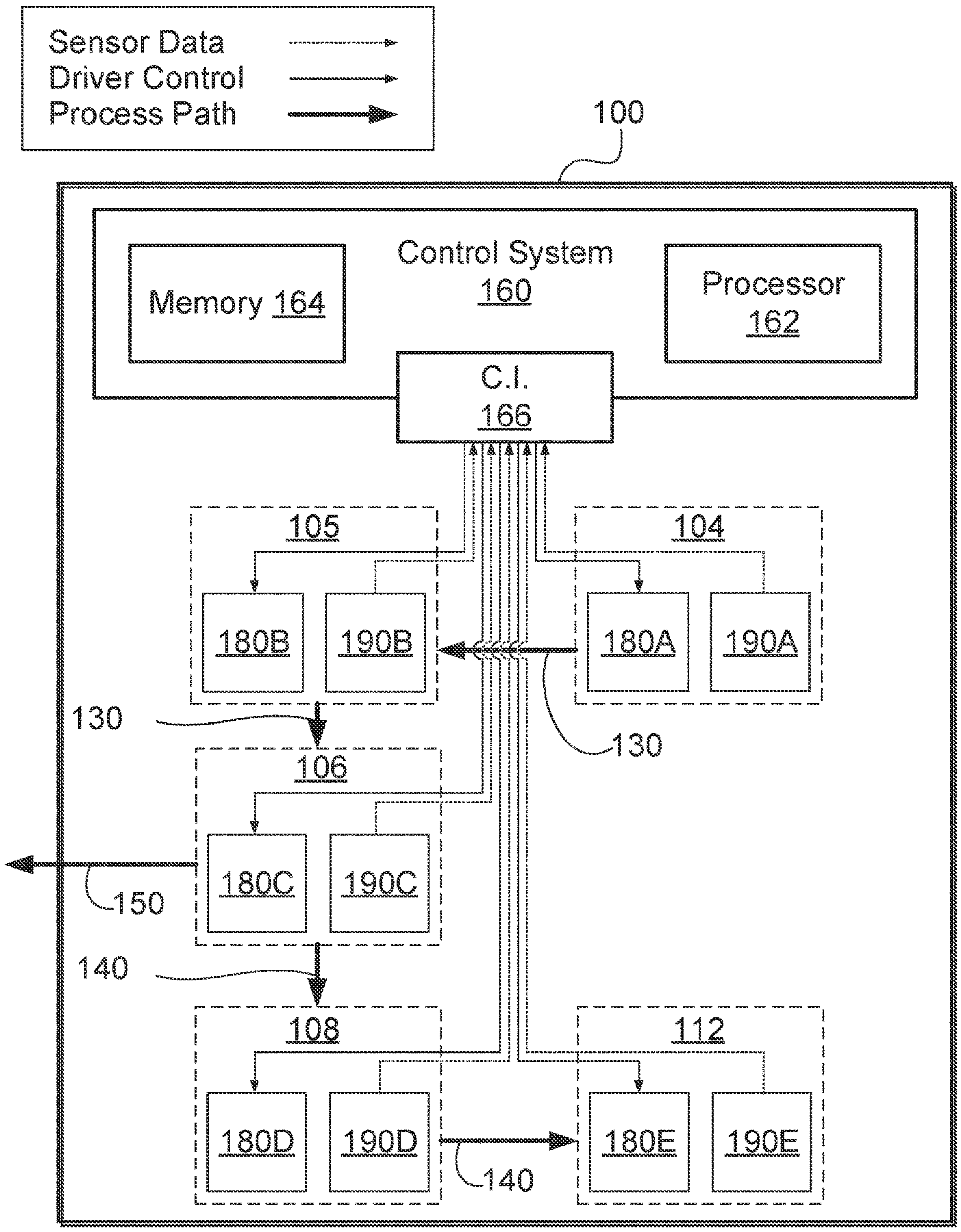

FIG. 1 illustrates a schematic of a printer 100 with an incising assembly according to embodiments of the present disclosure. The printer 100 includes a media supply 102 loaded on a spindle or hanger, a printhead 104, a substrate separator 106, an incising assembly 108 and a liner uptake mechanism 112, which may be loaded on a spindle. The printer 100 may include further components as are necessary for printing, but which are less pertinent to the novel subject matter of this disclosure, including but not limited to: printer electronics, guiding features, sensors, a housing, a base, a user interface, access panels or doors, a chassis, motors, drivers, control circuits, fans, and other components. In some examples the printer 100 is a thermal transfer printer, and other examples the printer 100 is a direct thermal printer. This disclosure further contemplates embodiments wherein the printer 100 is a laser printer, ink jet printer, and the like. Although illustrated as being contained within the printer, the present disclosure contemplates embodiments where any of the elements of FIG. 1, or combinations thereof, are external to the printer, e.g. the incising assembly 108 and the liner uptake mechanism 112 are not disposed within the printer housing.

In the illustrated printer, the media supply 102 is a media web 114 including a printable substrate 116 (e.g. adhesive labels) temporarily adhered to a liner 118, configured as a roll or a spool. The media supply 102 is positioned upstream of the printhead 104. For example, the media web 114 may extend from the media supply 102, through one or more guiding features, to the printhead 104. In at least one aspect, the media web 114 extends from the media supply 102, around a media guide and past a media sensor to arrive at the printhead 104.

In at least one aspect, the printer 100 can include a media input instead of a media supply 102. For example, a portion of media web 114 can enter into the media processing device through the media input and be loaded upstream of the printhead 104. As another example, a media supply can be located outside of the media processing device and a media web of the media supply can extend through the media input and be loaded the upstream end of the printhead 104. In an alternative aspect, the media can be supplied from a media stack instead of a media roll (e.g. a stack of plastic cards or a fanfold web of tag stock). When the media supply 102 is loaded into the printer 100, a portion of the liner 118 is separated from the media web 114 and guided through the rolling die 109 and press 110, and secured to the liner uptake mechanism 112, where tension can then be introduced in the media web 114 between the media supply 102 and the liner uptake mechanism 112.

The media supply 102 defines the beginning of the media process path 130. The media web 114 is pulled along the media process path 130, into proximity with the printhead 104, via guiding components and drivers, at which point the labels may be imparted with printed indicia, e.g. by the printhead.

One example printer may include printhead 104, e.g. a thermal printhead, laser printhead, or inkjet printhead, for use in a printing apparatus. The printhead 104 may include a printhead support bracket and various other conventional structures.

The media process path 130 then proceeds from the print head to the substrate separator 106, where the substrate separator 106 engages the media web 114, such that the printable substrate 116 is separated from the liner 118. The substrate separator 106 marks a divergence in the media process path 130, where the printable substrate is directed along a substrate process path 150, and the liner is directed along a liner process path 140. In some examples, the substrate separator 106 is a passive peel mechanism, which may include a series of rollers and fixed components, where the liner 118 is directed onto the liner process path 140, which is oriented at a sharp angle relative to the media process path 130. The printable substrate 116, having less flexibility than the liner 118, peels away from the liner 118 as the liner 118 is pulled through the sharp direction change.

Some embodiments may include a substrate separator 106 configured to peel the printable substrate 116 from a liner 118. The substrate separator 106 may define an engaged position corresponding to a peel position of the substrate separator 106 and a disengaged position corresponding to a non-peeling position of the substrate separator 106. A lock mechanism may be configured to lock the substrate separator 106 actuator in the first position.

In some examples an additional roller is positioned to guide the printable substrate 116 out of the printer 100 along a substrate process path 150.

In some examples, the tension necessary to separate the liner 118 from the printable substrate 166 is applied to the liner 118 via powered rollers which are disposed further along the liner feed path. The rollers may "pinch" the liner 118 and maintain the tension in the liner 118 between the rollers and the substrate separator 106. In some examples the powered rollers are included in a substrate separator assembly. The rollers may also be configured to feed the liner 118 along the liner process path 140. In other examples, the substrate separator 106 makes use of tension in the liner introduced by the liner uptake mechanism 112.

According to some embodiments, the substrate separator 106 may include a peel bar, a support member connected to the peel bar, and an actuating shaft engaged with the support member. In some alternative examples, a passive mechanism may be employed. The substrate separator 106 actuator may be configured to drive the rotation of the actuation shaft in response to the substrate separator 106 actuator being moved from the disengaged position to the engaged position. The support member may be attached to a printer chassis at a pivot point and the actuation shaft may be configured to pivot the support member about a pivot point in response to being rotated.

After separation, the label is then directed down substrate process path 150, e.g. ejected from the printer 100 to be applied to one of various uses. The liner 118 is directed down the liner process path 140 into the incising assembly 108, including a rolling die 109 and press 110 mechanism in the illustrated embodiment. The incising assembly 108 imparts the separated liner 118 with perforations to become a packing product 120 which is then wound about the liner uptake mechanism 112, which marks the end of the liner process path. In some examples, the liner uptake mechanism 112 may be configured as a reuptake spool.

Figure 2:
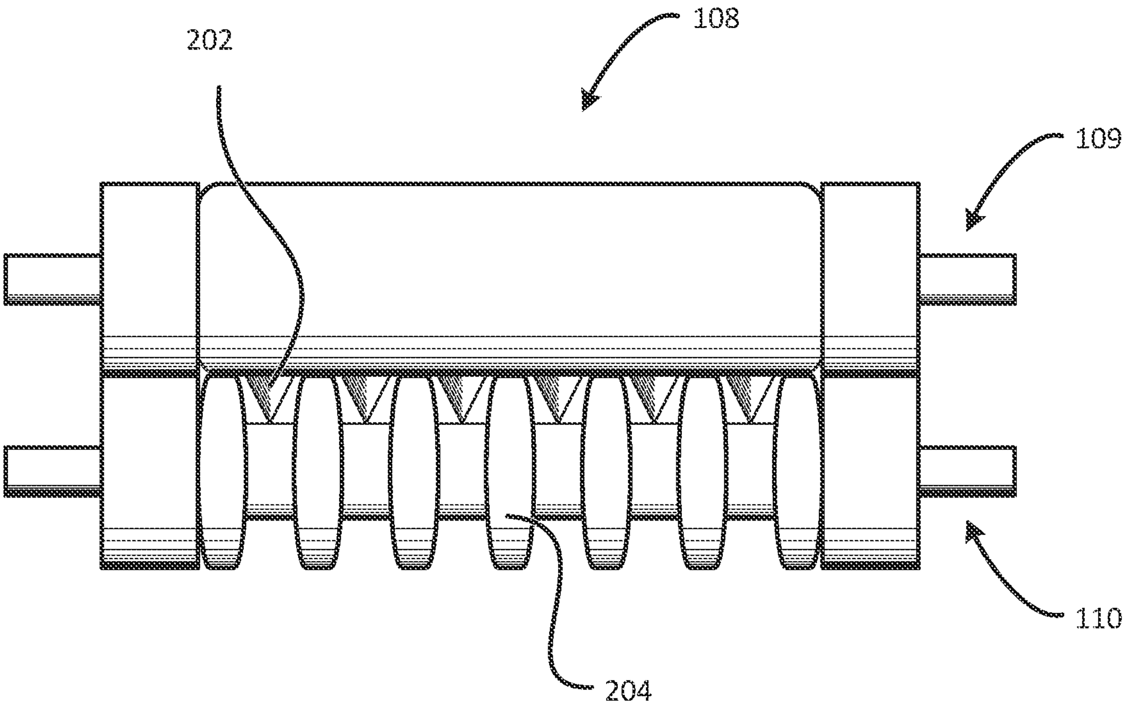
FIG. 2 illustrates an example incising assembly, according to embodiments of the present disclosure.

FIG. 2 illustrates an example of an incising assembly 108, including a rolling die 109 and press 110 mechanism, according to embodiments of the present disclosure. The rolling die 109 includes blades 202 disposed along an axial length of the rolling press 110 which are configured to pierce the separated liner 118 and impart the lines of weakness such that the liner 118 becomes a packing product 120. In some examples, the rolling die 109 has a plurality of rows of blades 202 disposed about the circumference of the cylindrical rolling die 109.

The press 110 mechanism includes rollers 204 which contact the surface of the rolling die 109 in between the blades 202. As the separated liner 118 is fed through the incising assembly 108, the rollers 204 ensure that the liner 118 is held at sufficient proximity to the rolling die 109 and at a sufficient tension that the blades 202 can pierce or score the liner 118 forming the lines of weakness. In the illustrated embodiment, the rollers 204 are arranged separately and in parallel with each other, and are distributed at intervals along the axial length of the press 110. The rollers 204 are disposed such that the blades 202 and rollers 204 do not directly contact one another, but provide sufficient tension such that the blades 202 are able to impart the lines of weakness into the liner 118.

In some embodiments, the rollers 204 may be a single continuous roller having indentations matched to the blades of the rolling die 109 such that the blades 202 do not directly contact the roller(s) 204.

In some embodiments, the incising assembly 108 is rotationally coordinated with other components in the printer 100, which may include the drivers, substrate separator 106 and the liner uptake mechanism 112, enabling the printer to start and stop regularly, without a loss of tension in the liner process path 140.

In some embodiments, the incising assembly includes mounting brackets, axles, gears, pinions, springs, tensioners, and other mechanical elements to ensure tension in the liner 118, as well as consistent traversal of the liner 118 through the incising assembly 108.

In some embodiments the incising assembly 108 may be configured towards alternate methods of imparting lines of weakness. This disclosure contemplates embodiments where the incising assembly is a stamping die and press, a punch, a slicer, a scorer, a perforator, a laser cutter, and other implements that may be employed to impart lines of weakness 410 into the liner 118.

Figure 3:
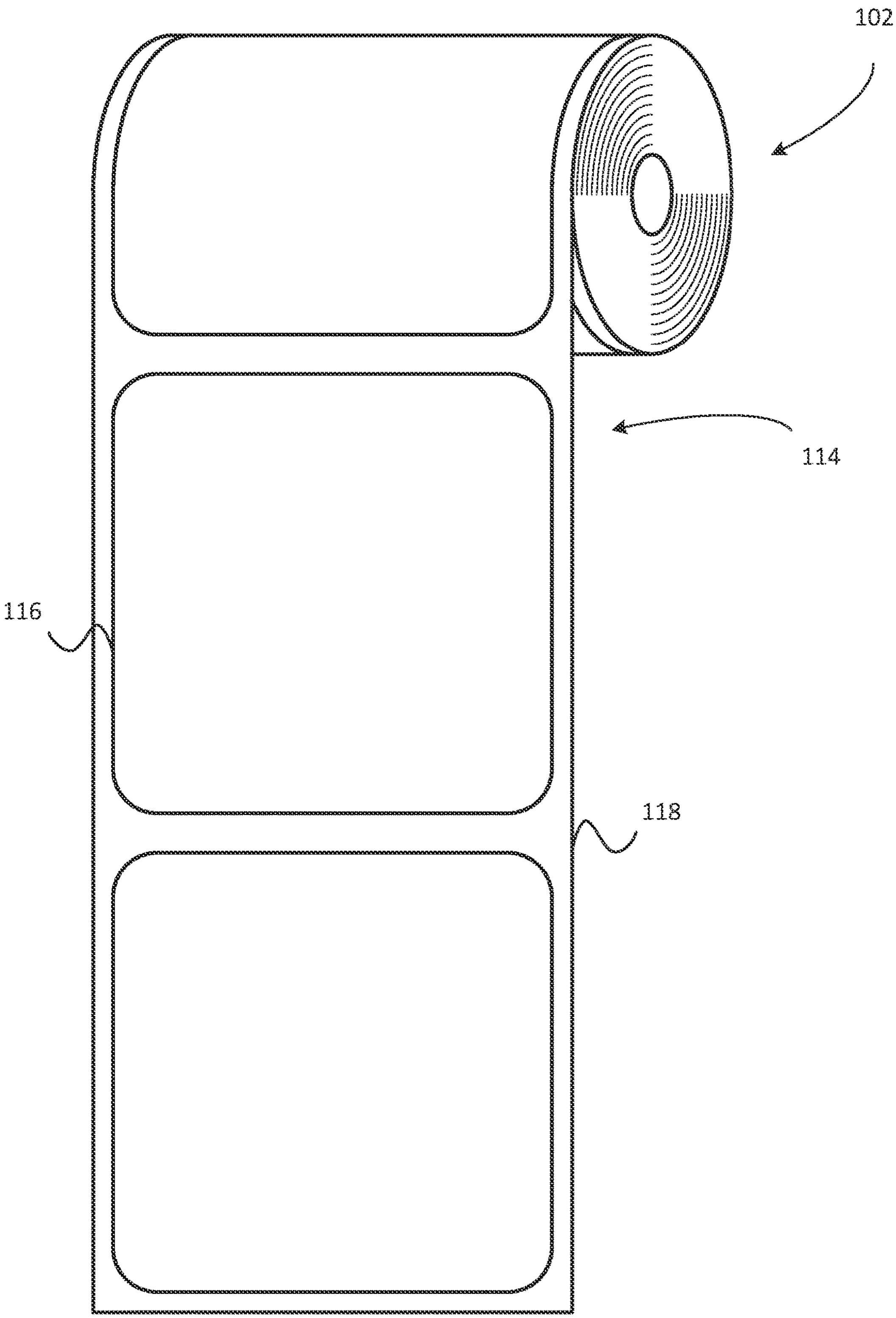
FIG. 3 illustrates a media supply of adhesive labels configured as a roll, according to embodiments of the present disclosure.

FIG. 3 illustrates a media supply 102, which holds media web 114, having a liner 118, and printable substrate 116, according to embodiments of the present disclosure. In some embodiments the liner 118 includes a silicone release coating, or other form of low adhesion release coating, such that the printable substrate 116 are easily released from the liner 118. In some embodiments the liner 118 is constructed of one or more materials including but not limited to glassine paper, clay coated kraft back paper, polyethylene terephthalate, polytetrafluoroethylene, filmic backing, and the like.

Figure 4:
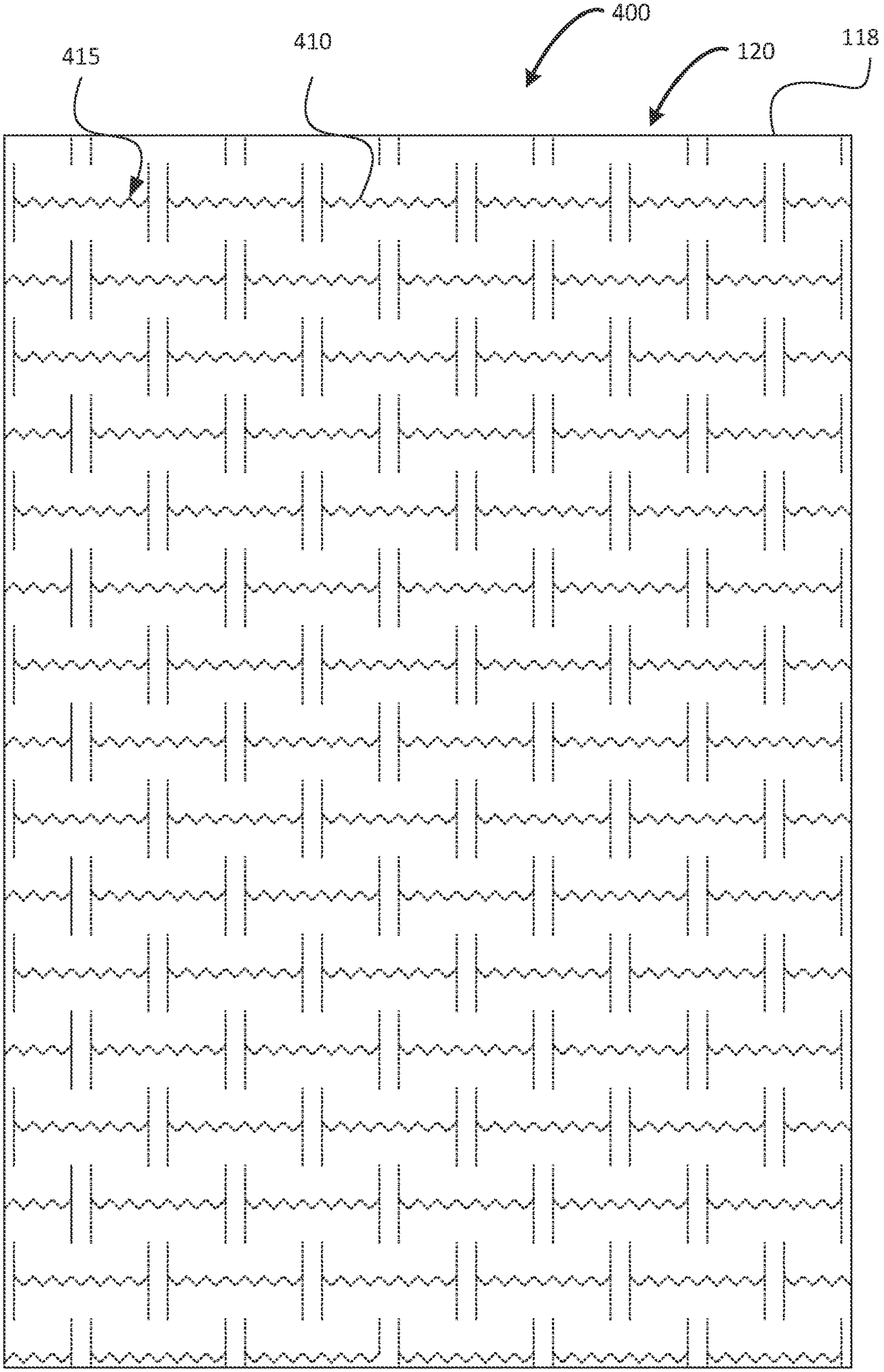
FIG. 4 illustrates a section of the packing product in an unexpanded configuration according to embodiments of the present disclosure.

FIG. 4 illustrates a section 400 of packing product 120, according to embodiments of the present disclosure. The packing product 120 includes lines of weakness 410 imparted into the liner 118. In some embodiments, the lines of weakness 410 imparted by the incising assembly 108 include identical subsections 415 of connected lines of weakness 410, with the subsections 415 then distributed over the liner 118 in a tiled pattern. In some embodiments the subsections 415 of lines of weakness 410 may be laterally or longitudinally offset from one another. In some embodiments the subsections 415 of lines of weakness 410 are laterally or longitudinally aligned with one another.

In the illustrated embodiment, each subsection 415 has two parallel longitudinal lines connected by a jagged lateral line. This disclosure further contemplates other subsections 415 of lines of weakness 410, including those with curved lines, jagged lines, and straight lines, and further including those with various forms of intersection at various angularities. As the lines of weakness 410 are imparted by the blades 202 of the incising assembly 108, the blades 202 are configured to impart the desired forms of the lines of weakness 410 into the liner 118.

Figure 5:
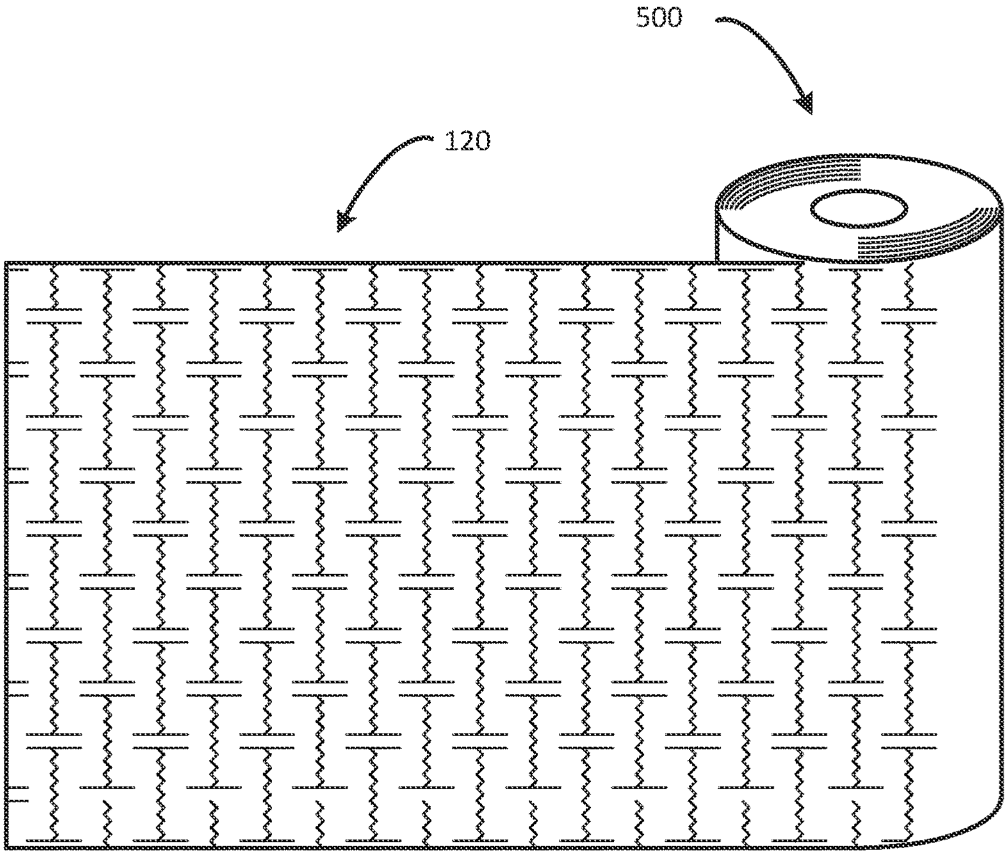
FIG. 5 illustrates a roll of packing product in an unexpanded configuration according to embodiments of the present disclosure.

FIG. 5 illustrates a roll 500 of packing product 120, according to embodiments of the present disclosure, which, in some embodiments, is removed from the liner uptake mechanism 112 after the media supply 102 has been exhausted. The roll 500 of packing product 120, once removed from the printer 100 may then be used as a supply of packing product 120.

Figure 6A:
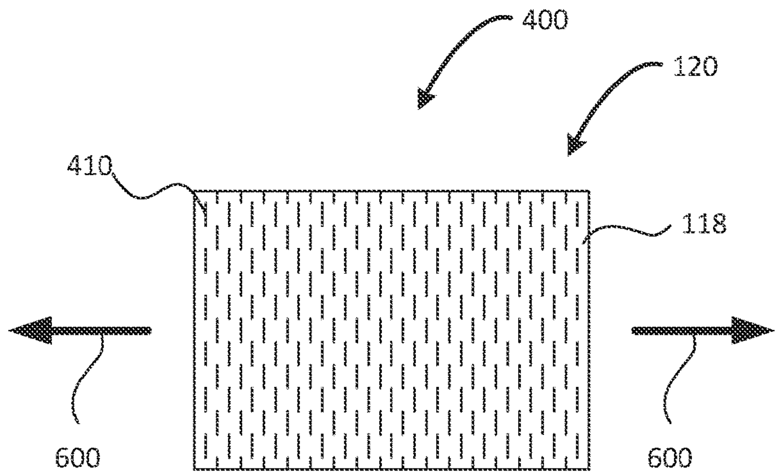
FIGS. 6A-6B illustrate the transition of a section of packing product from an unexpanded configuration to an expanded configuration according to embodiments of the present disclosure.

FIG. 6A illustrates a section 400 of packing product 120 in an unexpanded configuration. In the unexpanded configuration, the lines of weakness 410 in the liner 118 are unstrained, and the section 400 of packing product 120 has the same outer dimensions as an equivalently sized section of liner 118 that has not been imparted with lines of weakness.

Figure 6B:
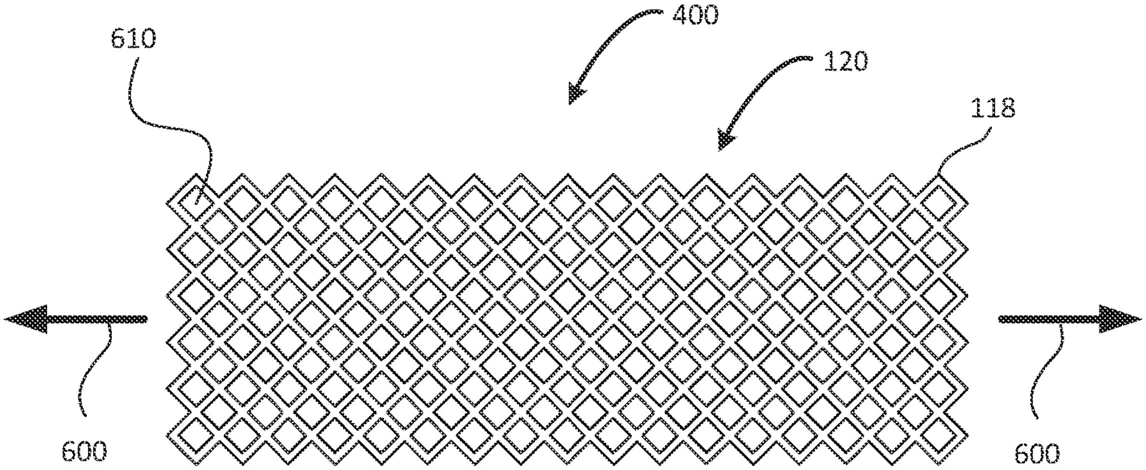

FIG. 6B illustrates a section 400 of a packing product 120 in an expanded configuration. The transition between the unexpanded configuration and the expanded configuration is a result of the tensile force 600. The tensile force strains the liner 118, which results in the lines of weakness 410 becoming gaps 610 in the liner 118 and allows the liner 118 to expand in the direction of the tensile force 600, while remaining unitary. The lines of weakness 410 are configured such that the gaps 610 resulting from the tensile force 600 allow the packing product 120 to expand in at least one dimension. In the expanded configuration, the lines of weakness 410 in the liner 118 are gaps 610, and the section 400 of the packing product 120 has outer dimensions that are greater than an equivalently sized section of liner 118 that has not been imparted with lines of weakness 410.

In some embodiments, the ratio between the lengths of corresponding dimensions of substantially equivalent sections of packing product 120 in the expanded configuration versus the unexpanded configuration, referred to as the expansion factor, may be in the range of 1.1 to 2. In some embodiments, the expansion factor is on the range of 2 to 3. In some examples the expansion factor is in the range of 2 to 4. In some examples the expansion factor is in the range of 1.1 to 4. In some embodiments, the lines of weakness 410 may be configured to facilitate the expansion of the packing product 120 in a lateral direction, e.g. in a direction perpendicular to the direction in which the packing product 120 is wound onto the liner uptake mechanism 112. In some examples the lines of weakness 410 may be configured to facilitate the expansion of the packing product 120 in a longitudinal direction, e.g. a direction parallel to the direction in which the packing product 120 is wound onto the liner uptake mechanism 112.

In the illustrated embodiment of FIGS. 6A-6B, the section 400 of packing product 120 has a longitudinal expansion factor of 2, such that when the tensile force 600 is applied in a longitudinal direction, the section 400 of packing product 120 expands (FIG. 6B) to twice the longitudinal length of the unexpanded section 400 of FIG. 6A. The illustrated embodiment of FIGS. 6A-6B has a lateral expansion factor of 1, and as such there is no expansion in the lateral dimension, regardless of the direction of an applied tensile force 600.

In another example embodiment, a section 400 of packing product 120 may have a lateral dimension of 3 inches and a longitudinal dimension of 4 inches; and the lines of weakness 410 may be configured to have a lateral expansion factor of 2 and a longitudinal expansion factor of 1.5. Application of a lateral tensile force 600 to the section 400 of packing product 120 may result in the expansion of the lateral dimension to 6 inches, and upon application of a perpendicular longitudinal tensile force 600, the section 400 of packing product 120 may expand to have a longitudinal dimension of 6 inches.

Figure 7:
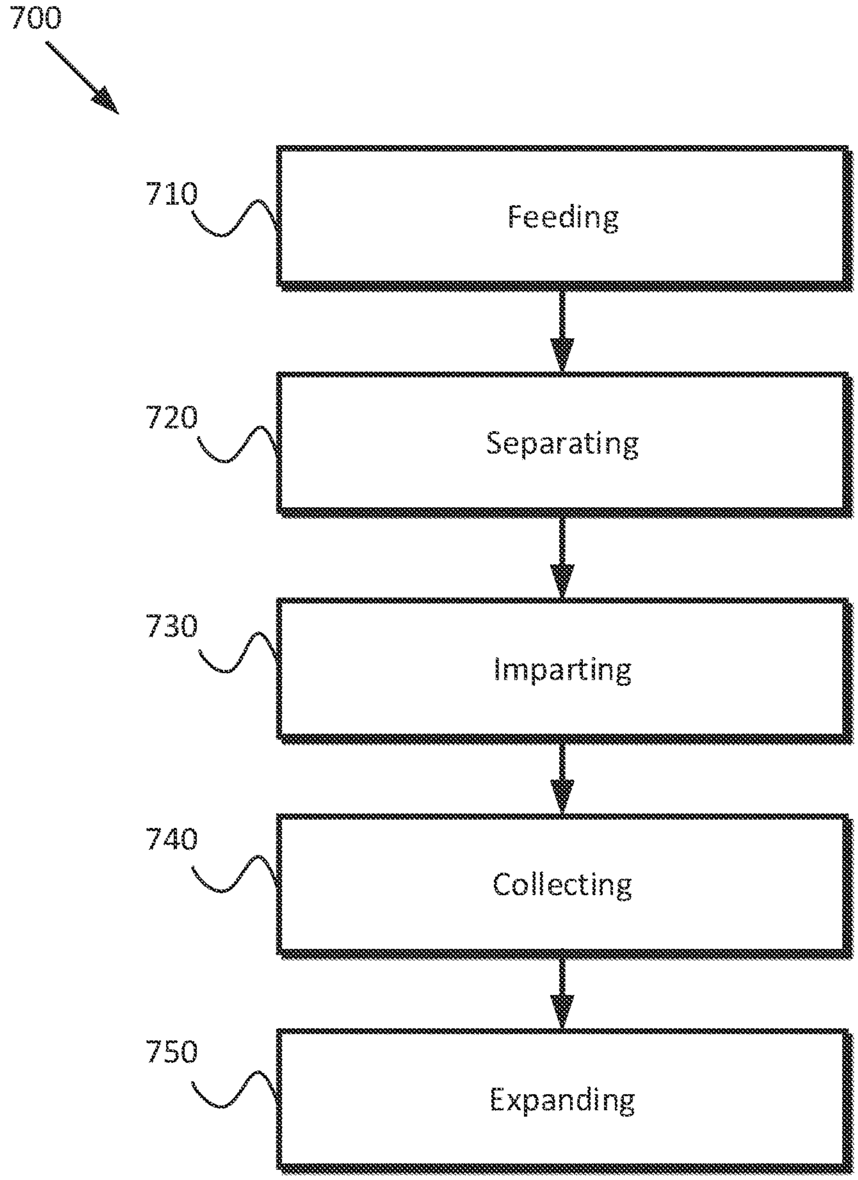
FIG. 7 illustrates a flowchart of a method for recycling the liner of a web of printable adhesive labels into a packing product, according to embodiments of the present disclosure.

FIG. 7 illustrates a flowchart of an example method 700 for recycling the liner of a web of printable adhesive labels into a packing product, according to embodiments of the present disclosure.

The web of printable media may be received from a roll, spool, fan fold stack or other supply configuration. In 710, a web of printable media is fed, through an upstream end of a printing device having an incising assembly. The media web may be a printable substrate e.g. a label, as described previously, and may be being temporarily adhered to a liner, e.g. a liner having a release coating such as a silicone release coating. In some embodiments, the printer into which the web of printable media is fed is the printer 100 of FIG. 1.

In 720 the liner is separated from the printable media. In some embodiments, the separation may occur after the printable substrate has been printed. In some examples, the printable substrate is separated from the liner by a substrate separator including a passive peel mechanism. The liner is directed through a sharp direction change and the printable substrate, having less flexibility than the liner, peels away from the liner.

In 730, the separated liner is imparted with lines of weakness. The imparting processes may be implemented via an incising assembly, such as the incising assembly of FIG. 2. In some embodiments, the incising assembly is a rolling die and press mechanism through which the liner is fed. The die includes blades disposed along an axial length of the rolling press which are configured to pierce the liner and impart the lines of weakness such that the liner becomes a packing product. In some examples, the rolling die has a plurality of rows of blades disposed about the circumference of the cylindrical rolling die.

As the liner is fed through the incising assembly, rollers ensure that the liner is held at sufficient proximity to the die and at a sufficient tension that the blades can pierce the liner forming the lines of weakness. In the some examples, the rollers are arranged separately and in parallel along the axial length of the press. The rollers are disposed such that the blades and rollers do not directly contact one another, but provide sufficient tension such that the blades are able to impart the lines of weakness into the liner.

In some embodiments the imparting process may be configured towards, or include alternate methods of imparting lines of weakness. This disclosure contemplates embodiments where the liner is stamped, perforated, sliced, scores, laser cut, or punched to from the lines of weakness in the liner.

In 740 the incised liner is collected. In some examples, the collection process includes a reuptake mechanism, such as the reuptake spool described in FIG. 1. For proper collection, care may need to be taken to balance the tension in the incised liner path, as excessive tensile forces may begin to expand the incised liner prior to collection. In some embodiments, this predicament may be circumvented by configuring the lines of weakness to expand responsive to a tensile force applied to the incised liner in a direction perpendicular to the direction in which the incised liner is collected. In some embodiments, the incised liner may be collected into a roll, a spool, or a fan fold stack. After collection, the collection apparatus, such as the roll, may be removed from the printer 100 to be applied to further purposes.

In 750 the liner is expanded to form a packing product. At the inception of the process, a user removes a section of incised liner from the collection apparatus. The user then applies a tensile force to the section of incised liner, such that the lines of weakness imparted into the liner in 730 expand to form gaps in the liner, and the liner becomes a packing product. In some embodiments, the tensile force is applied in a single direction to expand the liner, and in some embodiments, a pair of perpendicular tensile forces may be applied, as dictated by the configuration of the lines of weakness. In some embodiments, lines of weakness may be configured to effectively expand in one direction, and in some embodiments the lines of weakness may be configured to effectively expand in two directions. As used herein, “effectively expand” is taken to mean expanding with an expansion coefficient of at least 1.1.

After expansion, the packing product may be deformed and used as a package filler, used to physically insulate the contents of a package from movement within the package. A user may deform the packing material, via crumpling or similar action, resulting in a packing filler having a greatly reduced packing density and increased shock absorption capabilities compared to the incised liner prior to the expansion process and subsequent deformation.

As used in the specification and the claims, the term “incised” is understood to encapsulate the various forms of the lines of weakness imparted into the liner. The terms “punched”, “stamped”, “perforated”, “cut”, “scored”, “sliced” and “laser cut” are regarded as forms of incision for ease of understanding and clarity in the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A device comprising:

a substrate separator configured to receive a web of a printable substrate temporarily adhered to a liner and to separate the printable substrate from the liner;

a substrate process path configured to receive printable substrate separated from the liner by the substrate separator and output the printable substrate from the device;

a liner process path separate from the substrate process path and configured to receive the liner separated from the printable substrate by the substrate separator; and an incising assembly configured to receive the liner along the liner process path and to impart lines of weakness into the separated liner.

2. The device of claim 1, wherein the incising assembly is further configured to apply the lines of weakness to the liner so that when a tensile force is applied to a section of the liner after the lines of weakness are imparted, gaps form along the lines of weakness in the section of the liner, such that the section of the liner remains unitary while increasing in a length in a direction of the tensile force.

3. The device of claim 2, wherein a factor of expansion of the section of incised liner in the direction of the tensile force is in a range of 1.1 to 4.

4. Then device of claim 1, further comprising a reuptake mechanism, disposed downstream of the incising assembly along the liner process path, and configured to wind the incised liner about a roll or fold the incised liner into a fan-fold stack.

5. The device of claim 1, wherein the incising assembly is at least one selected from a group consisting of: a die and press, a rolling die and press, a punch, a slicer, a scorer, a perforator, and a laser cutter.

6. The device of claim 1, wherein the lines of weakness imparted by the incising assembly are at least one selected from a group consisting of: a score line, a perforated line, a fold, a punched hole, and a cut.

7. The device of claim 1, wherein the device is a thermal printer and the printable substrate is a configured for printing by a thermal printhead of the thermal printer.

* * * * *